(12) United States Patent
Herron

(10) Patent No.: US 8,777,703 B1
(45) Date of Patent: Jul. 15, 2014

(54) HIDE PULLER

(71) Applicant: Terence Ward Herron, Paola, KS (US)

(72) Inventor: Terence Ward Herron, Paola, KS (US)

(73) Assignee: Herron, Inc., Paola, KS (US)

( * ) Notice: Subject to any disclaimer, the term of this patent is extended or adjusted under 35 U.S.C. 154(b) by 0 days.

(21) Appl. No.: 13/775,615

(22) Filed: Feb. 25, 2013

(51) Int. Cl.
  *A22C 17/12* (2006.01)
  *A22B 5/16* (2006.01)

(52) U.S. Cl.
  CPC .................................. *A22B 5/161* (2013.01)
  USPC ......................................................... 452/128

(58) Field of Classification Search
  USPC .......... 452/125, 128, 132, 133, 185, 187–192
  See application file for complete search history.

(56) References Cited

U.S. PATENT DOCUMENTS

| | | | | |
|---|---|---|---|---|
| 3,894,311 A * | 7/1975 | Johnson | ......................... | 452/128 |
| 5,211,601 A * | 5/1993 | Cope | .............................. | 452/187 |
| 5,304,091 A * | 4/1994 | Wilkinson | .................... | 452/192 |
| 5,336,129 A * | 8/1994 | Frith | .............................. | 452/187 |
| 5,482,501 A * | 1/1996 | Frits | ............................... | 452/125 |
| 5,562,534 A * | 10/1996 | McGough | ..................... | 452/187 |
| 5,643,073 A * | 7/1997 | Tice | ................................ | 452/125 |
| 6,045,442 A * | 4/2000 | Bounds | ......................... | 452/187 |
| 7,549,545 B1 * | 6/2009 | Ashmore | ....................... | 212/180 |
| 7,588,487 B1 * | 9/2009 | Born, Jr. | ....................... | 452/132 |
| 7,625,269 B2 * | 12/2009 | Godwin | ......................... | 452/129 |
| 8,574,074 B2 * | 11/2013 | van Datta et al. | ............... | 463/33 |
| 2002/0094771 A1 * | 7/2002 | Butler | .......................... | 452/128 |
| 2002/0173262 A1 * | 11/2002 | Stiefel | .......................... | 452/185 |

* cited by examiner

*Primary Examiner* — Richard Price, Jr.
(74) *Attorney, Agent, or Firm* — Molly D. McKay

(57) ABSTRACT

A hide puller for skinning an animal with telescoping upright support member that is retractable for storage. The puller mounts on a truck hitch receiver. A pulley system with movable mounting bracket attached on an upper end of the support member and wings provided on a lower end of the upright support member. Button and loop fasteners are employed for securing the animal's hide to one end of the support member via either the mounting bracket or the wings and means for securing the animal's carcass to the opposite end of the upright support member via either the wings or the mounting bracket. A cable is attached to the pulley system and attached to means for retracting and releasing the cable to raise and lower the mounting bracket relative to the wings to remove hide from the carcass. A hunter's gambrel may substitute for the movable mounting bracket.

20 Claims, 5 Drawing Sheets

HIDE PULLER

CROSS-REFERENCE TO RELATED APPLICATIONS

The present application claims priority to U.S. Provisional Patent Application Ser. No. 61/634,532 filed on Mar. 2, 2012 for Hide Puller.

BACKGROUND OF THE INVENTION

1. Field of the Invention

The present invention is a hide puller or device for skinning an animal. More specifically it is a device that assists a sportsman in removing the skin or hides from a variety of animals or fish by providing a mechanized method of pulling the hide or skin from the carcass of the animal or fish.

2. Description of the Related Art

Skinning a large animal usually involves hanging the dead animal from a sturdy tree limb or other support structure and then, using a hunting knife, gradually cutting the skin loose from the carcass while pulling downward on the skin to remove the skin from the carcass. Because the skin is slippery and tightly adhered to the carcass, this can be a difficult and time consuming job.

The present invention addresses this problem by providing a device that can be mounted on a hitch receiver of a truck or other vehicle and can be used to assist in skinning large or small animals, including fish. The device has an extendable upright support member and has a pulley system that is attached on an upper end of the upright support member so that the animal's carcass and the animal's hide can be secured between the movable pulley system and a lower end of the upright support member to provide a pulling action on the animal's carcass and the animal's hide to assist in separating the hide from the carcass.

The upright support member telescopes so that it can be extended in telescopic fashion to the desire height for use in skinning an animal and can be retracted to a shorter configuration for transport or storage.

Animals that can be skinned using the present invention include, but are not limited to the following: deer, antelope, feral hogs, coyote, raccoon, bobcat, and nutria. Fish that can be skinned using the present invention include, but are not limited to the following: catfish, spoonbill, and stingray.

Once the animal has been skinned, the carcass may remain supported on the invention while being butchered, if desired.

SUMMARY OF THE INVENTION

The present invention is a hide puller which is a mechanism that can be mounted on a hitch receiver of a truck or other vehicle and can be used to assist in skinning large or small animals, including fish. The device has an extendable upright support member and has a pulley system that is attached on an upper end of the upright support member. A cable attached to the pulley system secures on one end to a movable mounting bracket to which the animal's carcass or the animal's hide can be secured, and the opposite end of the cable attaches to a means for retracting and releasing the cable to thereby raise and lower the mounting bracket on the upright support member. The means for retracting and releasing the cable may be a crank for winding the cable around a pulley provided on the upright support member, or alternately, may be a motorized winch.

A lower end of the upright support member is provided with wings or anchors to which the animal's hide, or alternately, the animal's carcass can be secured. In use either the animal's carcass is secured to the movable mounting bracket and the animal's hide is secured to the lower anchors or the animal's carcass is secured to the lower anchors and the animal's hide is secured to the movable mounting bracket. Once the animal's carcass and the animal's hide have been thus secured, the means for retracting the cable is activated so that the device helps to pull the hide off of the carcass as the user cuts the skin from the carcass.

In order for the animal's carcass to be secured to either the movable mounting bracket or to the lower anchors, the user may employ a rope with a slip knot secured around the animal's leg, antlers or other suitable appendages, or may employ a hook that is secured in the carcass or any other suitable means of fastening.

However, securing the animal's hide to either the movable mounting bracket or to the lower anchors is more difficult and this requires use of a specially designed button and loop fastener. First, the animal's skin or hide needs to be cut so that a portion of the skin free from the carcass and is available for fastening to the button and loop fastener. The button and loop fastener is comprised of two pieces: a button mechanism for inserting under the hide and a loop mechanism for securing around the button mechanism to secure the hide between the button and the loop mechanisms. The button mechanism has a smaller button for inserting under the hide and a second larger button that extends away from the hide, with the two buttons connected by a neck that is smaller in diameter than either of the two buttons. The neck is provided with an angled surface adjacent to the small button that is at approximately a 45 degree angle to the small button, and both the small button and the angled surface of the neck are knurled. The knurled surfaces on the small button and the angled surface of the neck help to grip and keep the hide from slipping while the hide is being pulled for removal.

The loop mechanism is provided with a graduated loop so that the smaller hide-covered button can be inserted in a larger diameter proximal portion of the graduated loop and the hide covered button can then be moved or slipped within the graduated loop into a smaller diameter distal portion of the graduated loop to wedge the graduated loop around the neck of the button mechanism. When the button is thus wedged within the graduate loop, the hide is firmly gripped between the button and loop mechanisms. The loop mechanism is provided with a clasp on an opposite end that can be secured either to openings provided in the movable mounting bracket or to openings provided in the lower anchors.

The upright support member telescopes so that it can be extended in telescopic fashion to the desire height for use in skinning an animal and can be retracted to a shorter configuration for transport or storage.

DETAILED DESCRIPTION OF THE PREFERRED EMBODIMENT

Figures 1, 2:
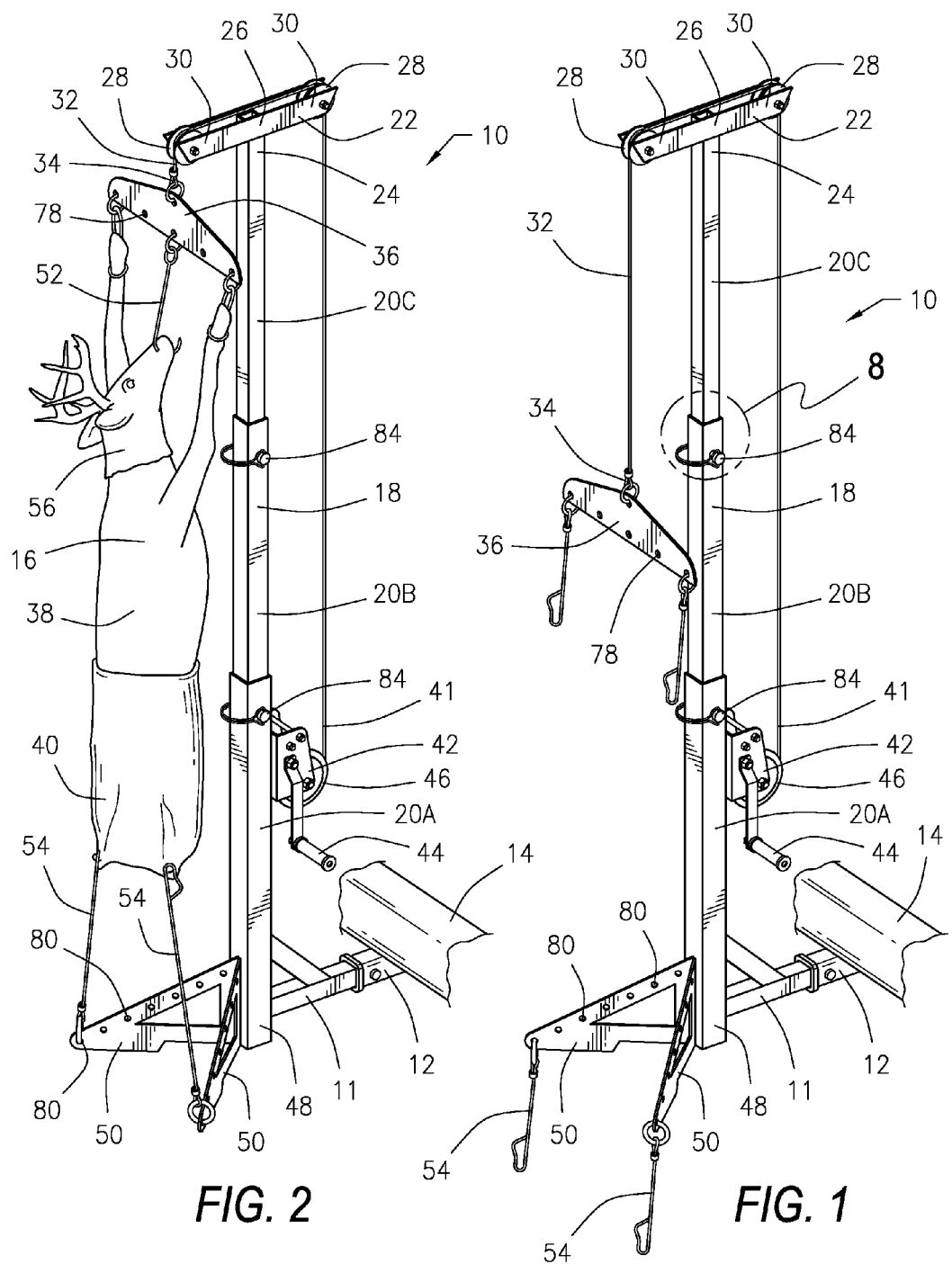
FIG. 1 is a perspective view of a hide puller constructed in accordance with a preferred embodiment of the present invention.
FIG. 2 is the hide puller of FIG. 1 shown with an animal's carcass attached to the hide puller's movable mounting bracket and the animal's hide attached to the hide puller's lower anchors.

Referring now to the drawings and initially to FIG. 1, there is illustrated a hide puller device 10 that is constructed in accordance with a preferred embodiment of the present invention. The hide puller 10 is a support mechanism with a trailer type tongue 11 that can be used to mount the puller 10 onto a hitch receiver 12 of a truck 14 or other similar vehicle and can be used to assist in supporting and skinning large or small animals 16, including fish.

Figures 3, 4:
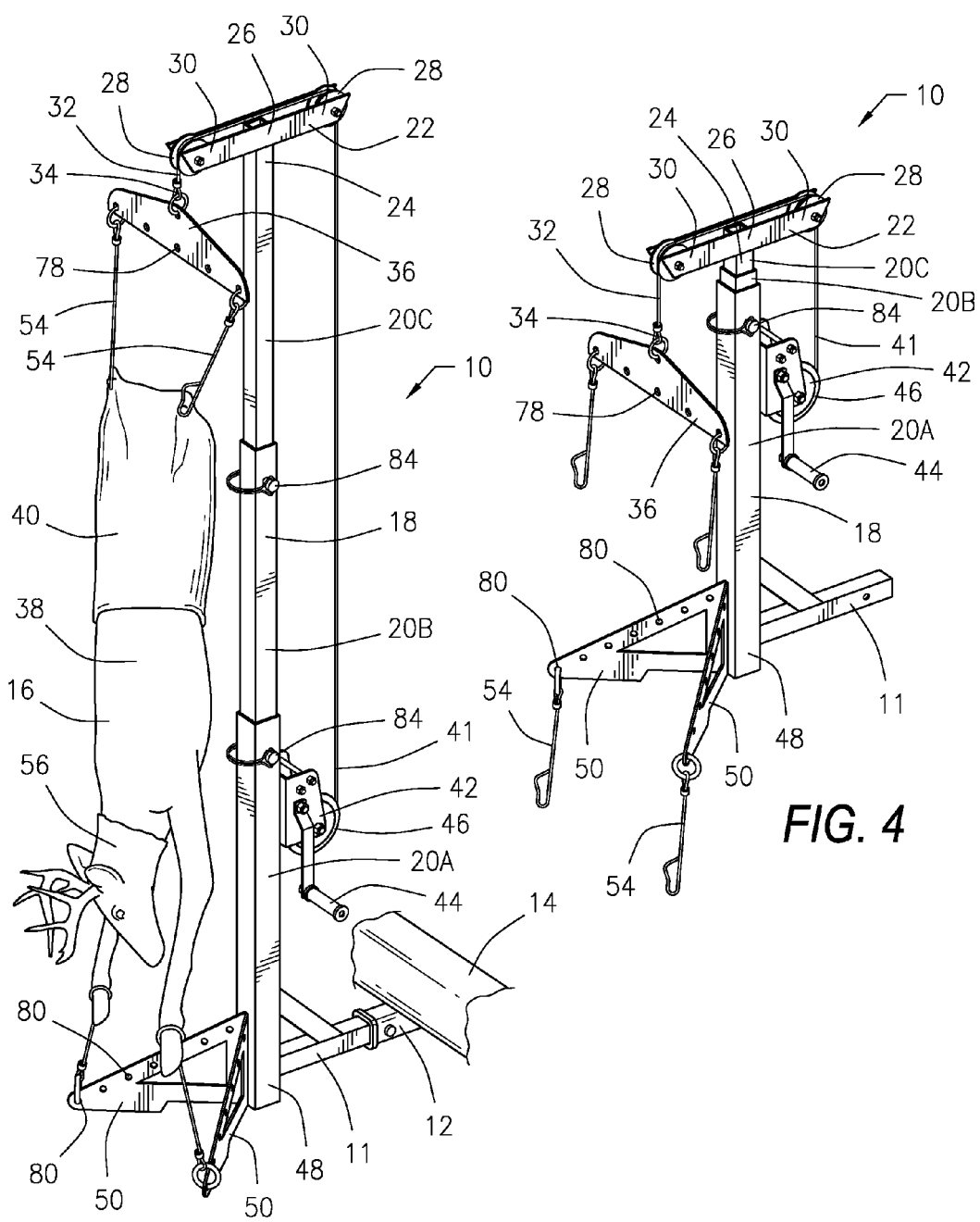
FIG. 3 is the hide puller of FIG. 1 shown with an animal's carcass attached to the hide puller's lower anchors and the animal's hide attached to the hide puller's movable mounting bracket.
FIG. 4 is the hide puller of FIG. 1 shown in a retracted position for transport or storage.

As illustrated in FIGS. 2 and 3, the device 10 has an extendable upright support member 18 composed of two or more telescoping sections 20A, 20B, and 20C. The support member 18 has a pulley system 22 that is attached on an upper end 24 of the upright support member 18. The pulley system 22 is comprised of a pulley support bracket 26 that is attached to the upper end 24 of the support member 18 and extends horizontally on either side of the support member 18. A pulley 28 is rotatably mounted on each of the two opposite ends 30 of the pulley support bracket 26 and a pulley cable 32 extends over the two pulleys 28 of the pulley system 22. One end 34 of the cable 32 secures to a movable mounting bracket 36 to which the animal's carcass 38 or the animal's hide 40 can be secured. A second opposite end 41 of the cable 32 secures to a mechanical means 42 for retracting and releasing the cable 32 to thereby raise and lower the mounting bracket 36 on the upright support member 18. The mechanical means 42 for retracting and releasing the cable 32 may be a crank 44 for winding the cable 32 around a cable winding pulley 46 provided rotatably attached to the upright support member 18, or alternately, may be a motorized winch (not illustrated) or other suitable means for rotating the cable winding pulley 46.

A lower end 48 of the upright support member 18 is provided with wings 50 that serve as anchors to which the animal's hide 40, or alternately, the animal's carcass 38 can be secured. The wings 50 have openings 52 through which fasteners can be attached as a means of securing the animal 16 to the wings 50.

In use, as illustrated in FIG. 2, the animal's carcass 38 is secured to the movable mounting bracket 36 and the animal's hide 40 is secured to the lower anchors. Alternately as illustrated in FIG. 3, the animal's carcass 38 may be secured to the lower anchors 50 and the animal's hide 40 may be secured to the movable mounting bracket 36. Once the animal's carcass 38 and the animal's hide 40 have been thus secured, the mechanical means 42 for retracting the cable 32 is activated so that the device 10 helps to pull the hide 40 off of the carcass 38 as the user simultaneously or alternately cuts the skin 40 from the carcass 38.

In order for the animal's carcass 38 to be secured to either the movable mounting bracket 36 or to the lower anchors 50, the user may employ a rope with a slip knot secured around the animal's leg 51, antlers or other suitable appendages, may employ a hook 52 that is secured in the carcass 38, or may employ a variety of other suitable fastening means that may be available.

However, securing the animal's hide 40 to either the movable mounting bracket 36 or to the lower anchors 50 is more difficult and this requires use of specially designed button and loop fasteners 54. The structure and use of one of these button and loop fasteners 54 is shown in detail in FIGS. 5-7 and 11. In order to use a button and loop fastener 54, first the animal's skin or hide 40 needs to be cut, such as for example around the neck 56 of the animal 16, so that a portion of the skin 40 is freed from the carcass 38 and is available for fastening to the button and loop fastener 54.

As shown, the button and loop fastener 54 is comprised of two pieces: a button mechanism 58 for inserting under the hide 40 and a loop mechanism 60 for securing around the button mechanism 58 to secure the hide 40 between the button and the loop mechanisms 58 and 60.

The button mechanism 58 is provided with a smaller button 62 for inserting under the hide 40 and a second larger button 64 that extends away from the hide 40, with the two buttons 62 and 64 connected by a button neck 66 that is smaller in diameter than either of the two buttons 62 and 64. The button neck 66 is provided with an angled surface 65 located adjacent to the smaller button 62. The angled surface 65 is oriented at an angle of approximately 45 degrees to the smaller button 62, and both the smaller button 62 and the angled surface 65 of the button neck 66 are provided with knurled surfaces 69A and 69B, respectively. The knurled surfaces 69A and 69B on the smaller button 62 and the angled surface 65 of the button neck 66 help to grip and keep the hide 40 from slipping while the hide 40 is being pulled for removal from the carcass 38. The design of the button and loop fastener 54 is such that the more tension that is placed on the cable 32, the tighter the button and loop fasteners 54 grip the hide, thus ensuring that there is no slippage as the animal 16 is skinned.

A first end 67 of the loop mechanism 60 is provided with a graduated loop 68 having a larger diameter proximal end 70 and an opposite smaller diameter distal end 72. The larger diameter proximal end 70 is large enough in diameter to admit the hide-covered smaller button 62 within the graduated loop 68, and the smaller diameter distal end 72 is sized to be slightly larger than the button neck 66.

In use, the hide-covered smaller button 62 is inserted in the larger diameter proximal portion 70 of the graduated loop 68 so that the button neck 66 is within the graduated loop 68. Then the button mechanism 58 is moved or slipped within the graduated loop 68 into the smaller diameter distal portion 72 of the graduated loop 68 to wedge the hide 40 between the distal portion 72 of the graduated loop 68 and the button neck 66 of the button mechanism 58. When the button mechanism 58 is thus wedged within the graduate loop 68, the hide 40 is firmly gripped between the button and loop mechanisms 58 and 60. An opposite second end 74 of the loop mechanism 60 is provided with a clasp 76 or other suitable fastener that can be secured either to openings 78 provided in the movable mounting bracket 36 or to openings 80 provided in the lower anchors 50.

Figure 8:
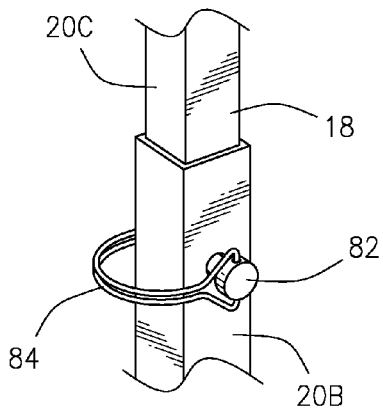
FIG. 8 is an enlarged view of the area within circle 8 of FIG. 1, showing the detail of how the telescoping sections are secured together with fasteners that insert in openings proved in the sections.
Figure 7:
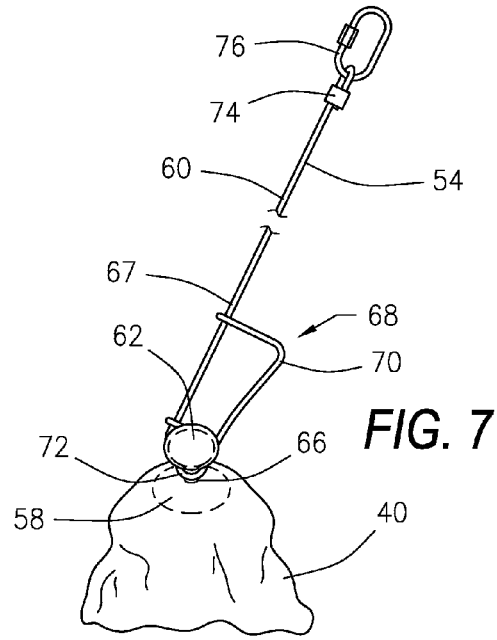
FIG. 7 is the button and loop fastener of FIG. 5 shown attached to the hide.
Figure 5:
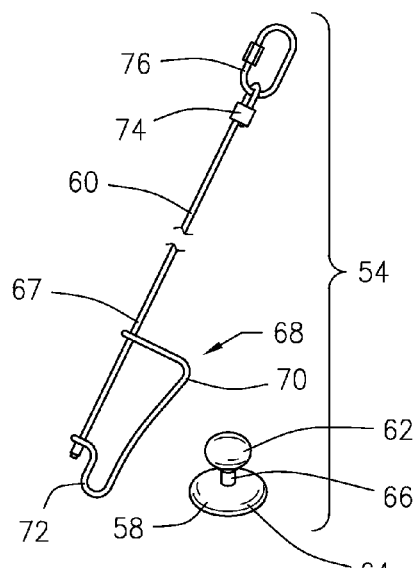
FIG. 5 is an enlarge view of a button and loop fastener employed on the invention.
Figure 6:
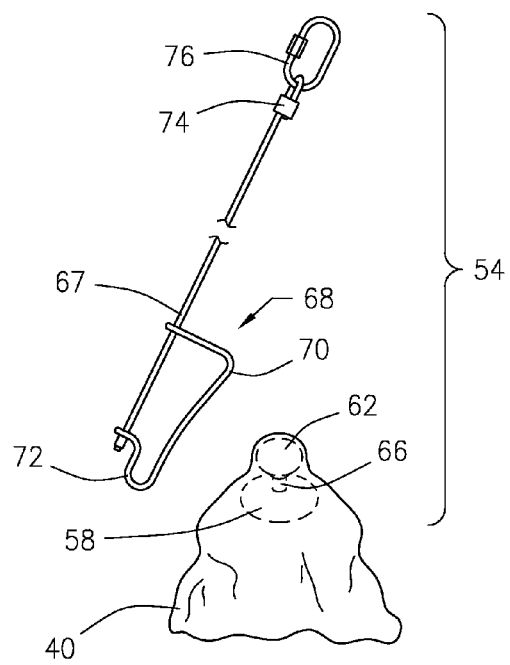
FIG. 6 is the button and loop fastener of FIG. 5, showing the button mechanism being placed under a free portion of skin and the loop mechanism being lowered onto the button mechanism.
Figure 11:
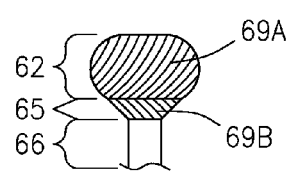
FIG. 11 is an enlarged partial view of the button mechanism of the button and loop fastener that shows the knurled surfaces on the smaller button and on the angled surface of the button neck that is located adjacent to the smaller button.

As shown in FIGS. 1 and 4, the upright support member 18 telescopes upward so that it can be extended in telescopic fashion to the desire height for use in skinning an animal 16, and alternately, can be retracted downward to a shorter configuration for transport or storage. As shown in FIG. 8, appropriate openings 82 are provided in the telescoping sections 20A, 20B, 20C of the support member 18 to admit support fasteners 84 to secure the various sections 20A, 20B, 20C together to achieve their desired extended upright positions. In order to insure that the sections 20A, 20B, 20C of the telescoping upright support member 18 do not bind when they are telescoping upward and downward, it may be desirable to construct one or more of the sections 20A, 20B, 20C from a tube that is square in cross sectional configuration.

Figure 9:
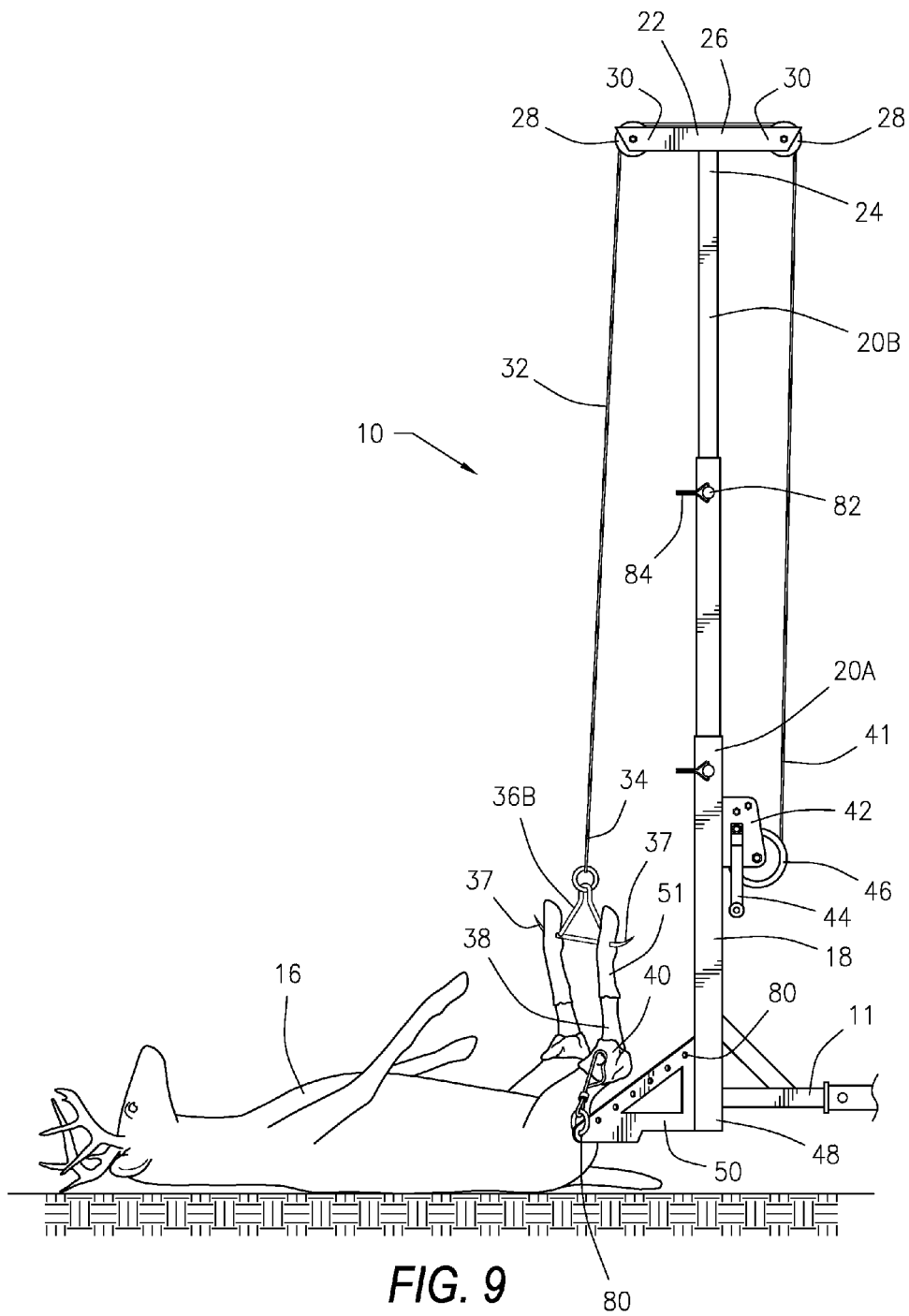
FIG. 9 is a perspective view showing an animal as it is being attached by its hind legs to the hide puller shown in FIG. 1.
Figure 10:
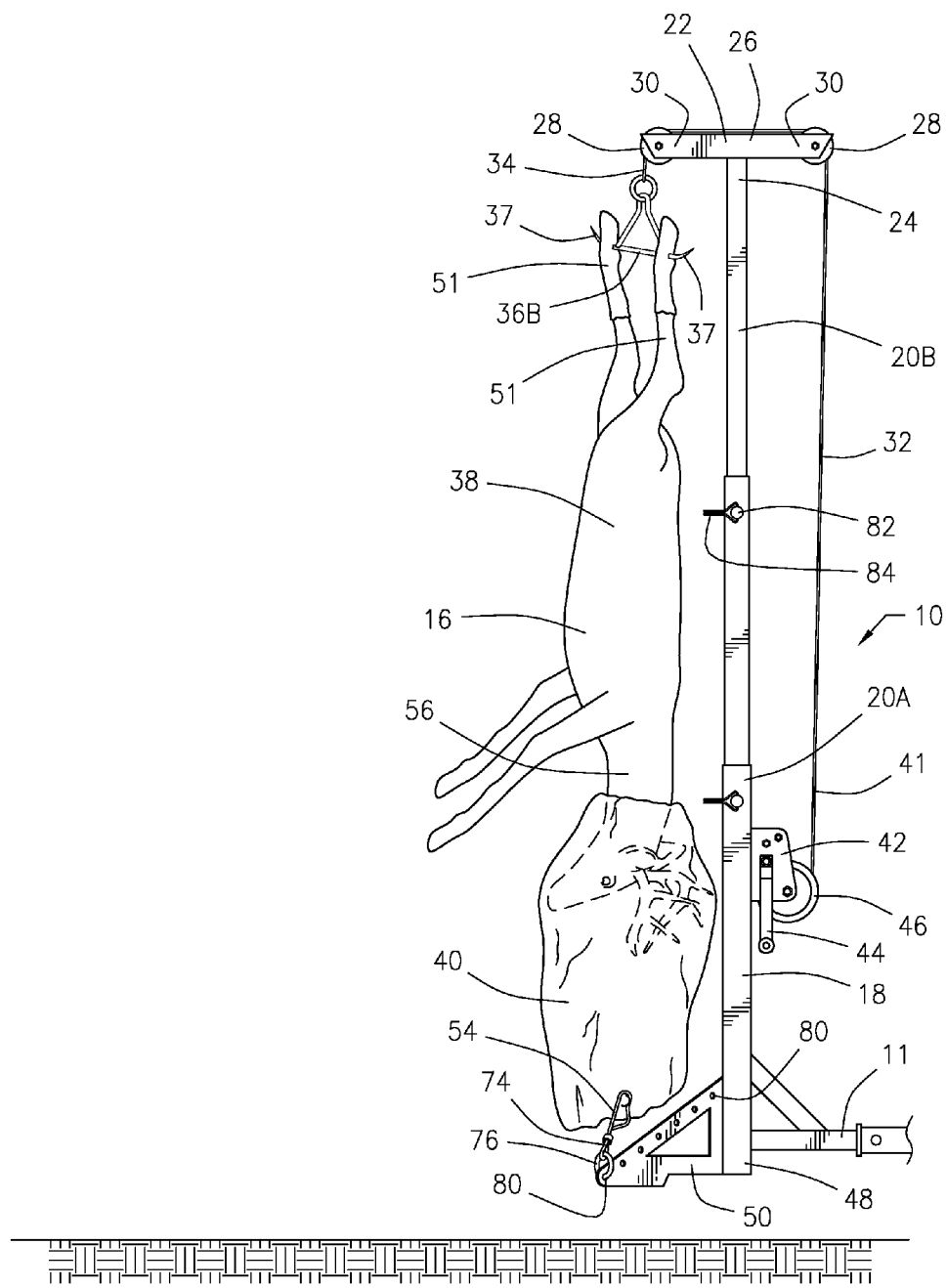
FIG. 10 is a perspective view showing the position of animal of FIG. 9 once the animal has been skinned with the aid of the hide puller.

Referring now to FIGS. 9 and 10, there is illustrated a typical and preferred use of the hide puller 10 to skin a large animal 16, such as for example a deer. First, the movable mounting bracket 36 has been replaced by a hunter's gambrel 36B. The gambrel 36B is lowered toward the ground where the animal 16 is laying to allow the animal's rear leg 51 to be attached to the gambrel by inserting the pointed ends 37 of the gambrel 36B through the Achilles' tendon of the animal's rear or hind legs 51. The hide 40 is then cut around the rear legs 51 so that the hide 40 can be attached to the wings 50 via the button and loop fasteners 54, as previously described. Then the crank 44 is turned to hoist the movable mounting bracket 36 and the attached animal 16 upward while the hide 40 is incrementally cut and pulled from the carcass 38 until the animal 16 assumes the fully skinned position shown in FIG. 10. At this point, the hide 40 is cut free from the carcass 38 at the animal's neck 56 and the carcass 38 can then be butchered or discarded, as desired.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A hide puller for assisting in supporting and skinning animals comprising:
   a telescoping upright support member, a trailer type tongue provided at a lower end of said support member such that the tongue can be reversibly mounted on a hitch receiver,
   means for securing and raising an object provided on an upper end of said support member, and
   stationary means for securing an object to a lower end of said support member such that when the object is secured to the upper end and lower end of the support member and the means for securing and raising an object provided on the upper end of said support member is used to raise the object, a pulling force is exerted on the object between the stationary lower end and the upper raising end of the support member.

2. A hide puller according to claim 1 further comprising:
   said support member composed of two or more telescoping sections such that the support member can be lengthened and shortened by sliding the telescoping sections relative to each other.

3. A hide puller according to claim 2 further comprising:
   the telescoping sections of the support member provided with openings, support fasteners securing in the openings of the telescoping sections to secure the sections together to achieve various desired extended upright positions.

4. A hide puller according to claim 3 wherein at least one of the telescoping sections of the support member is constructed from square tubing.

5. A hide puller according to claim 1 wherein the means for securing and raising an object further comprises:
   a pulley system attached on an upper end of the upright support member.

6. A hide puller according to claim 5 wherein the pulley system further comprises:
   a pulley support bracket attached to the upper end of the support member and extending horizontally on either side of the support member, a pulley rotatably mounted on each of the two opposite ends of the pulley support bracket,
   a pulley cable extending over the two pulleys of the pulley system, one end of the cable secured to a movable mounting bracket to which an object can be secured, and
   a second opposite end of the cable secured to a mechanical means for retracting and releasing the cable to thereby raise and lower the mounting bracket on the upright support member.

7. A hide puller according to claim 6 wherein the mechanical means for retracting and releasing the cable further comprises:
   a crank and a rotatable cable winding pulley provided on the support member, said crank functionally attached to the rotatable cable winding pulley such that the cable winds around the cable winding pulley when the crank is turned to thereby raise and lower the mounting bracket.

8. A hide puller according to claim 6 wherein the movable mounting bracket is a hunter's gambrel.

9. A hide puller according to claim 6 further comprising:
   the movable mounting bracket provided with openings, fasteners attaching to the openings as a means of securing an object to the mounting bracket.

10. A hide puller according to claim 9 wherein the fasteners are button and loop fasteners.

11. A hide puller according to claim 10 wherein the button and loop fasteners further comprise:
    a button mechanism for inserting under the hide,
    and a loop mechanism for extending around the button mechanism to secure an animal hide between the button mechanism and the loop mechanism.

12. A hide puller according to claim 11 wherein the button mechanism further comprises:
    a smaller button, a second larger button connected to the smaller button by a button neck, and said button neck being smaller in diameter than either of the other two buttons.

13. A hide puller according to claim 12 wherein the button mechanism further comprises:
    said button neck provided with an angled surface located adjacent to the smaller button, and both the angled surface and the smaller button provided with knurled surfaces.

14. A hide puller according to claim 11 wherein the loop mechanism further comprises:
    a first end of the loop mechanism provided with a graduated loop having a larger diameter proximal end and an opposite smaller diameter distal end, the larger diameter proximal end being large enough in diameter to admit within the graduated loop the smaller button when the smaller button is covered by an animal's hide, and the smaller diameter distal end sized to be slightly larger than the button neck.

15. A hide puller according to claim 14 wherein the loop mechanism further comprises:

an opposite second end of the loop mechanism is provided with a clasp that secures to the openings provided in the movable mounting bracket.

16. A hide puller according to claim 1 wherein the stationary means for securing an object to a lower end of said support member further comprises:

wings provided on a lower end of the upright support member, and openings provided in the wings to which fasteners attach to secure an object to the wings.

17. A hide puller according to claim 16 wherein the fasteners are button and loop fasteners.

18. A hide puller according to claim 17 wherein the button and loop fasteners further comprise:

a button mechanism for inserting under the hide, and a loop mechanism for extending around the button mechanism to secure an animal hide between the button mechanism and the loop mechanism.

19. A hide puller according to claim 18 wherein the button mechanism further comprises:

a smaller button, a second larger button connected to the smaller button by a button neck, said button neck being smaller in diameter than either of the other two buttons, said button neck provided with an angled surface located adjacent to the smaller button, and both the angled surface and the smaller button provided with knurled surfaces.

20. A hide puller according to claim 19 wherein the loop mechanism further comprises:

a first end of the loop mechanism provided with a graduated loop having a larger diameter proximal end and an opposite smaller diameter distal end, the larger diameter proximal end being large enough in diameter to admit within the graduated loop the smaller button when the smaller button is covered by an animal's hide, the smaller diameter distal end sized to be slightly larger than the button neck, and an opposite second end of the loop mechanism is provided with a clasp that secures to the openings provided in the wings.

\* \* \* \* \*